United States Patent
Anton et al.

(10) Patent No.: US 6,790,924 B2
(45) Date of Patent: Sep. 14, 2004

(54) METHOD FOR PROTECTION OF STONE WITH FLUORINATED URETHANE

(75) Inventors: Douglas Robert Anton, Wilmington, DE (US); Jack Robert Kirchner, Wilmington, DE (US); William Howard Tuminello, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/168,117

(22) PCT Filed: Feb. 22, 2001

(86) PCT No.: PCT/US01/05901

§ 371 (c)(1), (2), (4) Date: Jun. 13, 2002

(87) PCT Pub. No.: WO01/62687

PCT Pub. Date: Aug. 30, 2001

(65) Prior Publication Data

US 2003/0050367 A1 Mar. 13, 2003

(51) Int. Cl.[7] .................................. C08G 18/50

(52) U.S. Cl. ................ 528/49; 528/70; 427/385.5; 428/421; 52/517

(58) Field of Search .............. 427/385.5; 428/421; 528/49, 70; 52/517

(56) References Cited

U.S. PATENT DOCUMENTS

| | | |
|---|---|---|
| 4,499,146 A | 2/1985 | Piacenti et al. |
| 4,745,009 A | 5/1988 | Piacenti et al. |
| 4,746,550 A | 5/1988 | Strepparola et al. |
| 4,764,431 A | 8/1988 | Piacenti et al. |
| 4,902,538 A | 2/1990 | Piacenti et al. |
| 4,923,720 A | * 5/1990 | Lee et al. |
| 5,827,919 A | * 10/1998 | May et al. |

FOREIGN PATENT DOCUMENTS

WO    WO 9919080    4/1999

* cited by examiner

Primary Examiner—Rachel Gorr

(57) ABSTRACT

This invention relates to the application of fluorinated urethane compositions to stone in order to protect the stone from the deleterious effects of water and pollution.

14 Claims, No Drawings ical importance. A variety of
METHOD FOR PROTECTION OF STONE WITH FLUORINATED URETHANE

FIELD OF THE INVENTION

This invention pertains to the application of fluorinated urethane compositions to stone in order to protect the stone from the deleterious effects of water and pollution. Preservation of historic monuments, buildings, sculptures is one object of the present invention. Provision of weather and pollution resistant stone construction materials is another object of the present invention.

TECHNICAL BACKGROUND OF THE INVENTION

It has long been recognized that a combination of man-made and natural atmospheric factors are having deleterious effects on stone structures including many monuments of considerable artistic and historical importance. A variety of efforts have been undertaken over the years to identify ways to protect and preserve these structures, but these efforts have met with only partial success. Most recently, a well-organized and concerted effort has been undertaken by Piacenti and coworkers, with sponsorship from the Target Project for the Cultural Heritage of the Consiglio Nazionale della Recerche of Rome, Italy, and represents the current state of the art.

Water, in the form of both rainfall and condensation, is the primary material of concern, although organic matter may be of secondary concern. For example, all building materials are subject to stress and concomitant cracking resulting from the penetration of water into the structure of the material followed by cycles of freezing and thawing. Also, water in combination with $CO_2$, which occurs naturally, and nitrous and sulfurous gases, which are man-made pollutants, forms acids which rapidly eat away at the stone.

A successful attack on the problem will necessitate some tradeoffs. While it is highly desirable to minimize the contact between water and stone, by achieving maximum water repellency, it is also necessary to provide high water vapor permeability in order to permit venting of that water which finds its way into the microstructure of the stone. Substances with high permeability to water vapor are often not those of the highest water repellency. High resistance to acid and abrasion are also of considerable importance. Furthermore, cost of materials is a factor in any practical application. The smaller the amount of material required to achieve the desired effect, the better.

There are other tradeoffs. For example, it is particularly desirable that the coating material coat but preferably not block the pores. To achieve this, a coating must be applied with viscosity in a range which permits wetting of the pores via capillary action. High wetting is also required to ensure thorough and uniform coverage. However, the coating must be provided with sufficient adhesion to the outside surface upon which it is deposited that at least some amount will remain thereon.

Other requirements for such materials include chemical inertness, low volatility, photooxidative stability, thermal stability, sufficient solubility in environmentally friendly solvents to permit removal at some future date. The coating must also be clear and colorless, and remain so for its lifetime. And it should be susceptible to dissolution in environmentally friendly solvents for purposes of application. In the current state of the art, the application solvent of choice is supercritical $CO_2$, as described in Carbonell et al., WO 99/19080.

In a series of patents, U.S. Pat. Nos. 4,499,146, 4,746,550, 4,745,009, 4,902,538, Piacenti et al. disclose compositions based upon perfluoropolyethers having molecular weights in the range of 500–5000 for use in the protection of stone from the effects of water and atmospheric pollutants. In the art of Piacenti, excellent combinations of water repellency and water vapor permeability are achieved.

In U.S. Pat. No. 4,902,538, good results are achieved in compositions having highly crystalline particles of polytetrafluoroethylene and copolymers thereof intermixed with the perfluoropolyethers. However, when stone of porosity of greater than ca. 30% is treated, impractically high levels of coating material are required to achieve the desired coverage with the desired water repellency. Levels in the range of at least 150 g/m² are disclosed, more than 10 times the amount required for low-porosity marble. The effect of this high coating level on permeability is not disclosed. Its effect on cost, however, is clearly undesirable. Furthermore, use of highly crystalline polymers, such as polytetrafluoroethylene, is undesirable because, unless they are sintered at high temperatures, they will be too readily susceptible to removal from the treated surface by abrasion and erosion. Further still, they are not readily soluble in the delivery medium of choice, $CO_2$, or any other desirable medium.

Also disclosed in the art in Piacenti et al., U.S. Pat. No. 4,764, 431, are copolymers of vinylidene fluoride which are less effective than the perfluoropolyethers.

Fluorinated acrylic polymers are disclosed by Ciardelli et al., *Prog. in Org. Coatings*, 32, 43–50 (1997). The polymers disclosed therein are characterized by hydrocarbon backbones and fluorinated pendant groups. These polymers exhibit similar functionality to the perfluoropolyethers.

Guidetti et al. disclose the use of polyfluorourethanes for protecting stone in "Polyfluorourethanes as stone protectives", *7th International Congress on Deterioration and Conservation of Stone*, 1053–62 (1992).

There is considerable incentive in the art to discover new materials which possess several of the above attributes desired for the application.

SUMMARY OF THE INVENTION

The present invention provides a process for protecting stone comprising contacting stone with a non-polymeric composition having the formula

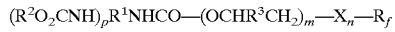

where p=1 or 2, $R^1$ is an aliphatic, cycloaliphatic or aromatic hydrocarbyl di- or tri-radical, $R^2$ is a fluorinated or non-fluorinated hydrocarbyl or hydroxy-hydrocarbyl radical optionally substituted by one or more ether oxygens, $R^3$ is hydrogen or alkyl, X is a diradical selected from the group consisting of —OCH$_2$CH$_2$—, —OCH$_2$CH$_2$N(R$^4$)SO$_2$—, —CH$_2$—, —O—, and —OCH$_2$—, wherein R$^4$ is alkyl, R$_f$ is perfluoroalkyl, and m=0–30, n=0 or 1, with the proviso that if n=0 or if n=1 and X is —O—, then m≠0.

DETAILED DESCRIPTION

For the purpose of the present invention, the term "stone" means a natural stone used in construction or sculpture (such as granite, marble, limestone, or sandstone) as well as tile, cement, brick, stucco, and the like.

The method of the present invention provides surprising benefits over the methods of the art. In the method of the present invention, a slightly fluorinated non-polymeric urethane composition is employed as a coating agent for stone in order to provide high liquid moisture barrier, good moisture vapor permeability, and resistance to environmental pollutants. The non-fugitive, very low areal density coating formed on the stone surface is surprisingly effective over the materials of the art. Furthermore, the urethane of the present invention is readily soluble in a variety of solvents by virtue of its non-polymeric nature, and is thereby both readily applied in the form of an environmentally friendly solution and readily removed by conventional solvents should that be deemed necessary after application. Further still, the highly desirable effects of the method of the present invention are achieved employing a urethane containing relatively little of expensive fluorocarbon ingredients.

Suitable for the practice of the present invention are urethanes represented by the formula

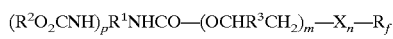

where p=1 or 2, preferably p=1. $R^1$ is an aliphatic, cycloaliphatic or aromatic hydrocarbyl di- or tri-radical. Preferably $R^1$ is a di-radical; more preferably, $R^1$ is a cycloaliphatic diradical. $R^2$ is a fluorinated or non-fluorinated hydrocarbyl or hydroxyhydrocarbyl radical optionally substituted by one or more ether oxygens. Preferably the urethanes are a mixture where $R^2$ is $R_f$ and/or alkyl. Most preferably $R^2$ is $R_f$ and/or methyl or ethyl. $R^3$ is hydrogen or alkyl, preferably $R^3$ is hydrogen. X is a diradical selected from the group consisting of —OCH$_2$CH$_2$—, —OCH$_2$CH$_2$N(R$^4$)SO$_2$—, —CH$_2$—, —O—, and —OCH$_2$—, wherein $R^4$ is alkyl. $R_f$ is a perfluoroalkyl radical, and may in practice be a mixture of perfluoroalkyl radicals, m=0–30, n=0 or 1, with the proviso that if n=0 or if n=1 when X is —O—, then m≠0. Preferably, n=0, and m=1 to 20, most preferably m=1.

In a preferred embodiment, $R^1$ is a cycloaliphatic diradical represented by the formula

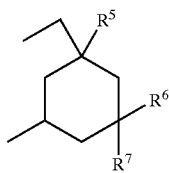

wherein and $R^5$, $R^6$, and $R^7$ are all alkyl, preferably methyl.

The urethanes suitable for use in the present invention are known in the art and may be synthesized according to the methods described in Anton et al., U.S. Pat. No. 5,859,126, Anton, U.S. Pat. No. 5,637,657, and Anton et al., U.S. Pat. No. 5,605,956.

In a preferred embodiment, the fluorinated organic urethane is an adduct of a fluorinated monofunctional alcohol, a non-fluorinated organic polyisocyanate and a non-fluorinated organic alcohol. Suitable polyisocyanates include aromatic, aliphatic and cycloaliphatic di and trifunctional polyisocyanates such as 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane diisocyanate, 4,4'-diisocyanatodiphenylether diisocyanate and the like.

Typical trifunctional isocyanates that can be used are triphenylmethane triisocyanate, 1,3,5-benzene triisocyanate, 2,4,5-toluene triisocyanate and the like. Oligomers of diisocyanates also can be used such as the trimer of hexamethylene diisocyanate which is sold under the tradename "Desmodur" N. Preferably, aliphatic diisocyanates would be used and most preferably cycloaliphatic diisocyanates.

Preferred fluorinated monofunctional alcohols are represented by the formula

where $R_f$ is preferably a straight chain or branched chain fluoroalkyl or chlorofluoroalkyl group having 4–20 carbon atoms optionally substituted by ether oxygen. Preferably, $R_f$ is a perfluoroalkyl group having 4–20 carbon atoms and most preferably, $R_f$ is a perfluoroalkyl group containing 6–12 carbon atoms. X is a divalent radical, preferably —CH$_2$CH$_2$O—, —SO$_2$N(R$^4$)CH$_2$CH$_2$O—, —CH$_2$—, —O—, or —CH$_2$O— where $R^4$ is an alkyl group preferably having 1–4 carbon atoms. $R^3$ is H or an alkyl group having 1–4 carbon atoms, H and methyl being preferred. n is 0 or 1 and m is 0–30, provided that if n is 0 or if n=1 and X is —O—, then m must be greater than or equal to 1; preferably n=0 and m is 1 to 20. Most preferably, m=1.

Preferred fluorinated monofunctional alcohols are represented by one of the following formulae:

where $R_f$ is a perfluoroalkyl group having 6 to 12 carbon atoms optionally substituted by ether oxygen and m is 5 to 15;

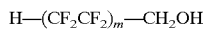

where m is 1–6;

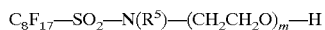

where $R^5$ is an alkyl group having 1–4 carbon atoms and m is 1–30, preferably m is 1–20;

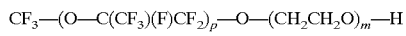

where n is 0–10 and m is 1–20; and

where $R_f$ is described above.

A number of fluorinated alcohols are available commercially as Zonyl® Fluorotelomer Intermediates from E.I. du Pont de Nemours and Company, Wilmington, Del.

Other perfluoroalkyl alcohols can also be used in the present invention, such as 2-N-methyl-N-ethanolperfluorooctane sulfonamide, available commercially from Dainippon Ink and Chemical, Inc., Tokyo 103, Japan. Fluorinated diols prepared by the procedure of U.S. Pat. No. 4,946,992 and fluorinated thiols prepared as in U.S. Pat. No. 3,544,663, in particular Example 1 therein, are also suitable.

It will be understood by the practitioner of the art that the ingredients employed in the reaction to form the urethane of the present invention, and therefore the product urethane generated therefrom may be mixtures of one or more of the compounds hereinabove said to be suitable for the practice of the invention. In particular, the Zonyl® Fluorotelomer Intermediates preferred are in fact mixtures of a homologous series of species represented by the formula

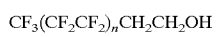

where n is 3 to 9.

The fluorinated organic urethane of the method of the present invention is prepared as taught in the art hereinabove cited, in which the fluorinated monofunctional alcohol, organic polyisocyanate and organic alcohol are charged into a reaction vessel optionally with solvents and a catalyst for about 0.1–4 hours and heated to about 50°–120° C., preferably 60°–85° C.

About 0.1 to 100 mole % of active isocyanates are reacted with the fluorinated alcohol. Preferably, greater than 40% of the isocyanates are reacted with the fluorinated alcohol and most preferably greater than 75%. The remaining isocyanates are reacted with monofunctional organic alcohols such as allyl or propyl alcohols.

Typical solvents that are used are alkyl acetates such as ethyl acetate, butyl acetate and the like, alkylene glycol alkyl ether acetates such as ethylene glycol, monobutyl ether acetate and the like and ketones such as acetone, methyl ethyl ketone, and methyl isobutyl ketone.

Typical catalysts that are used are organo tin containing catalysts like alkyl tin laurates such as di-n-butyl tin dilaurate, dibutyl tin di-2-ethylhexoate, stannous octoate, stannous oleate and the like.

In the practice of the present invention, one or more of the urethanes hereinabove described are applied by any convenient method to the surface of the stone which is to be protected from the effects of water, such as rainfall, and environmental pollutants. Foremost, the coating must provide a barrier to liquid water with minimal effect on the natural water vapor permeability of the stone. One way of achieving this is to provide durable coating in as thin a layer as possible on the wall surface of each pore of the stone without actually filling or blocking the pore using a material of the lowest possible surface tension. Coating materials which exhibit a desirable combination of properties are characterized by pendant groups comprising perfluoroalkyl functional groups in sufficient concentration that the surface presented to incident liquid water such as rainfall is characterized by a high density of the perfluorinated groups and a consequently very low surface tension. In the most preferred embodiment of the urethane of the method of the present invention, the perfluoroalkyl group in $R_f$ as hereinabove defined has at least 7 carbons in a linear chain. The resulting low surface tension achieved by the application of the preferred urethane to a porous stone surface is the source of the thermodynamic driving force for complete wetting of the pores as well as liquid water repellency. To reduce the kinetic barrier to complete pore wetting, the viscosity should be as low as possible. This represents a particularly desirable attribute of the method of the present invention because the urethane employed in the method of the present invention is a non-polymeric liquid which readily forms low viscosity solutions in a number of convenient solvents.

While in no way limiting the scope of the invention, it is estimated that the viscosity of the coating during application of the coating to the stone is preferably less than about 10 Pa-s to achieve optimum coating performance. It will be obvious to one of skill in the art that while it is desirable to employ materials which afford low viscosity solutions, usually associated with low molecular weight or non-polymeric materials, the materials so employed cannot be of such low molecular weight that they evaporate from the stone surface. Until the discovery of the method of the present invention, all materials in the art employed for application to stone for the purpose of preservation have been polymeric.

It is further preferred that polar groups such as urethanes should be present in the coating material to promote adhesion of the coating material to the stone surface and decrease the tendency of the coating material to continually penetrate to the interior of the stone and reducing surface efficacy in terms of liquid water repellency. Esters, amides, and —$CH_2CF_2$— moieties are examples of other such adhesion-promoting polar groups.

While according to the method of the present invention it is possible to apply the urethane to the stone in neat chemical form, using methods such as are known in the art such as painting or spraying, it is preferred to dissolve the urethane in a solvent which acts as a volatile diluent in the spraying operation to afford fast penetration at the early stages of coating while providing a high degree of control over the viscosity, the uniformity of coating and the coating thickness.

Solvents suitable for the practice of the present invention include acetone, methyl-ethyl ketone, ethyl acetate, t-butyl acetate, methyl isobutyl ketone (MIBK), hydrochlorofluorocarbons, perfluorocarbons. In the most preferred embodiment, the urethane of the present invention is dissolved in supercritical $CO_2$ according to the methods described in Carbonell et al., WO 99/19080 or in the alternative in U.S. Pat. Nos. 4,923,720; 5,108,799; 5,290,603; and 5,290,604. Methyl isobutyl ketone is a preferred solvent for malting the urethanes as well as for diluting it to a suitable viscosity for absorption into stone within a practical time period. A preferred concentration of MIBK is urethane is 10% to 20% by weight.

These materials would preferably be sprayed from $CO_2$ solutions of 75 weight % or less polymer at 40 to 70° C., 2000 to 4000 psi. To promote material absorption into the stone it might also be preferable to add up to about 40 weight % acetone, t-butyl acetate, Oxol 100 (4-chlorobenzotrifluoride), or other such environmentally friendly diluent to the urethane.

It will be understood by one of skill in the art that numerous chemical compounds have been identified which may serve as the supercritical fluid for the urethane coating composition of the invention. However, $CO_2$ is by far the preferred compound because of the low cost, low toxicity, ready formation of a supercritical fluid, and low environmental impact.

The urethane component of the coating composition is generally present in amounts ranging from 1 to 80 weight percent, based upon the total weight of the coating composition. Preferably, the urethane component should be present in amounts ranging from about 15 to about 55 weight percent on the same basis.

The supercritical fluid diluent should be present in such amounts that a liquid mixture is formed that possesses such a viscosity that it may be applied as a liquid spray. Generally, this requires the mixture to have a viscosity of less than about 300 centipoise at spray temperature. Preferably, the viscosity of the mixture of components ranges from about 5 centipoise to about 150 centipoise. Most preferably, the viscosity of the mixture of components ranges from about 10 centipoise to about 50 centipoise.

The supercritical carbon dioxide fluid is most preferably present in amounts ranging from about 45 to about 85 weight percent on the total compositional weight, thereby producing a mixture having viscosities from about 10 centipoise to about 50 centipoise at spray temperature.

While the art of applying coatings from supercritical $CO_2$ teaches the use of an organic solvent in combination with a polymeric coating material and supercritical $CO_2$, it is a particularly useful aspect of the present invention that the preferred urethane composition of the invention is a liquid at room temperature, and it is not necessary to form a low-viscosity solution or dispersion for mixing with the $CO_2$. It is however optional to add a third component to the coating composition of the invention, the third component comprising one or more organic solvents employed for the purpose of improving viscosity control during spraying and "laydown" of the coating material on the stone.

The organic solvents suitable for the practice of the most preferred embodiment of the invention generally include any solvent or mixture of solvents that is miscible with $CO_2$, is a good solvent for the urethane, and is fugitive at the temperature at which the coating is being applied to the stone, normally at temperatures of about 0° C. or above. Preferably, the solvent is also environmentally friendly. Suitable organic solvents include acetone, methyl-ethyl ketone, methyl isobutyl ketone, ethyl acetate, t-butyl acetate, hydrochlorofluorocarbons, and perfluorocarbons with acetone, methyl-ethyl ketone, ethyl acetate and t-butyl acetate preferred.

The coating composition of the invention is sprayed onto a substrate to form a liquid coating thereon by passing the liquid mixture under pressure through an orifice into the environment of the substrate to form a liquid spray.

Spray orifices, spray tips, spray nozzles, and spray guns used for conventional airless and air-assisted airless spraying of coating formulations such as paints, lacquers, enamels, and varnishes, are suitable for spraying the coating composition of the present invention. The spray pressure used in the practice of the present invention is a function of the specific coating formulation. In the case of supercritical fluid solutions, the minimum spray pressure is at or slightly below the critical pressure of the supercritical fluid. Generally the pressure will be below 5000 psi. Preferably, the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used in the practice of the present invention is a function of the coating formulation. The minimum spray temperature is about 31° C. The maximum temperature is determined by the thermal stability of the components in the liquid mixture. The preferred spray temperature is between 35° C. and 90° C. The most preferred temperature is between 45° C. and 75° C. Generally liquid mixtures with greater amounts of supercritical carbon dioxide fluid require higher spray temperatures.

One of skill in the art will recognize that the method of the present process, while specifically directed to the protection of stone, may equally be employed to apply coatings to a variety of substrates. Examples of suitable substrates include but are not limited to metal, wood, glass, plastic, paper, cloth, ceramic, masonry, stone, cement, asphalt, rubber, and composite materials.

Through the practice of the present invention, coatings may be applied to substrates in thicknesses of from about 0.5 to 100 micrometers. Preferably, the coatings have thicknesses of from about 1.0 to about 15 micrometers, while most preferably, their thicknesses range from about 1.5 to about 10 micrometers.

The method of the present invention provides a considerable benefit in that the urethane coating may be readily removed using inexpensive and environmentally benign solvents such as t-butyl acetate and acetone if it should be deemed desirable at some point in time following the application thereof.

The coatings on stone produced by the practice of the present invention are highly beneficial to the purpose of protecting the stone from environmental degradation. Two key attributes which are indicative of susceptibility to weathering are water absorption, typically by capillary action through the porous stone structure, and water vapor permeation rate. It is highly desirable that the water absorption of normally highly absorbent stone be reduced by as large a factor as possible, while water vapor permeability, normally high as well, be maintained at a high level. The coated stone of the present invention provides both high levels of water vapor permeability by virtue of the thin coatings which are found to be effective in providing the desired high resistance to water penetration.

The method of the present invention and the properties of the coated stone compositions provided thereby are further illustrated in the following specific embodiments.

EXAMPLES

In the following examples, a pressure cell as described in Tuminello et al., *J. Appl. Polym. Sci.*, 56, 495 (1995)., was used to evaluate the solubility of the urethane specimens below in $CO_2$. The total volume of the cell was about 3.0 ml. Solid fluorinated material solute sufficient to make about a 17 volume percent solution was added to the cell first. A vacuum was applied for a few minutes and then liquid $CO_2$ was added until the cell was filled at its vapor pressure, about 6.2 MPa (900 psi). Pressures could be increased to as high as 31.7 MPa (4600 psi) by pushing a piston through a manifold loaded with $CO_2$. Temperature was increased to as high as 100° C. with an electrical heating band around the pressure chamber. Temperatures as low as about −10° C. were achieved by removing the heating band and packing dry ice around the cell. Cloud point was determined by visual observation through the sapphire windows provided on the cell. Cloud point was determined at constant temperature with decreasing pressure and is defined as that pressure at which the mixture became so opaque that it was no longer possible to see the stirring paddle inside the cell. Cloud point data for each sample is listed below.

In the following examples, the procedures followed in determining water absorption and permability were essentially those described in Italian standard test methods AA.VV, *Assorbimento di acqua per capillarità*, Raccomandazione NORMAL 11/85, CNR-ICR, Roma 1985 and 7 AA.VV, *Permeabilità al vapor d'acqua*, Raccomandazione NORMAL 121/85, CNR-ICR, Roma 1985.

Two stone substrates were employed, each in the form of prism-shaped specimens 5×5×2 cm in size. They were:
  (a) Marble—White Carrara marble with grey veins, 99% calcite, polygonal structure and fine grains. Total porosity=3.83±0.2%; saturation index=7.4±0.6%.
  (b) Biocalcarenite—Lecce stone composed of Foraminifera with calcareous shell, glauconite grains and very small fragments of quartz. The clasts are bound by a micritic calcitic cement with a low clay content. Total porosity=32 to 40%; saturation index=65±5.0%.

In each example, the average of the results obtained on three separate prism shaped specimens was determined. Five untreated stone specimens of each type were retained as controls. The stone specimens were maintained in a dessicator containing $CaCl_2$ until a constant mass was reached using a lab balance of precision of ±1 mg.

The coating was applied (from 2 weight % reagent grade acetone solutions) to one face of each stone specimen by painting with a brush as uniformly as possible. This was done after removing the stone from the dessicator. Coating thickness was determined by weighing before and after treatment. The painted stone specimens were then left at room temperature in ambient air for one week to evaporate the solvent and then placed in a dessicator along with the control specimens containing $CaCl_2$ until constant mass was achieved.

Each stone specimen thus brought to constant mass, was removed in turn from the dessicator and placed in contact with a stack of filter paper (1 cm thick; 9 cm diameter) soaked in distilled water. The amount of water absorbed by capillarity was determined by weighing the sample after a fixed time (marble—60 min.; biocalcarenite—20 min). Protective efficacy ($E_p\%$) was calculated by the following expression:

$$E_P\% = \frac{(A_{UN} - A_T)}{A_{UN}} \cdot 100$$

where $A_{UN}$ and $A_T$ are the amounts of water absorbed by the untreated and treated samples, respectively.

In the ideal there would be no water absorption, or $E_p\%=100$. In the current state of the art, a very good level of efficacy is considered to be 80 to 90%.

Each stone test specimen was mounted as a lid to a poly(vinyl chloride) test cell containing 10 ml of distilled water. The cell was equipped with neoprene gaskets to keep the sample in place while leaving an area of about 16 $cm^2$ through which water vapor could permeate. The cell was then placed in a thermostatic drybox maintained at a constant temperature of 25.0±0.5° C., and containing a sufficient amount of silica gel and calcium chloride to maintain constant relative humidity of 2 to 5%.

A balance was placed in the drybox to monitor weight changes in the cell without the need to open the drybox. The weight of each cell was monitored every 24 hours for several days. Weight loss became constant after a few days. The permeability (P) of the surface of the stone to water vapor was calculated using:

$$P=M/A(g/m^2 \text{ in 24 hrs.})$$

where M is the amount of water, in grams, lost in 24 hours and A is the evaporating area, in $m^2$, of the system.

The reduction in permeability ($R_p\%$) due to the treatment is defined as:

$$R_P\% = \frac{(P_{UN} - P_T)}{P_{UN}} \cdot 100$$

where $P_{UN}$ and $P_T$ are the permeability of the untreated and treated samples, respectively. This procedure is described in more detail elsewhere. The best performance is to have permeability matching that of the untreated sample, or $R_p\%=0$.

Examples 1 and 2

IPDI/TBA/ROH (50:50)

Isophorone diisocyanate was reacted with telomer B alcohol, $CF_3(CF_2)_{4-12}CH_2CH_2OH$, in a mole ratio of 1:1 so that 50% of the isocyanates reacted to form a fluorinated urethane. The reaction was then finished by reacting the remaining isocyanate moieties with allyl alcohol to produce a mixture of fluorinated urethanes represented primarily by the structures:

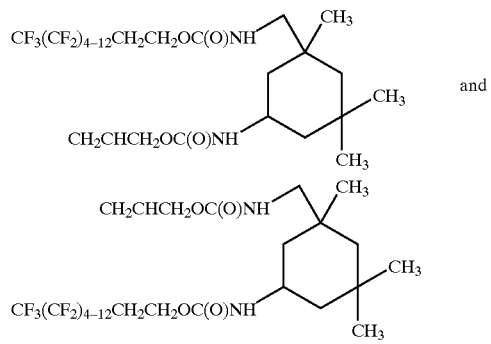

and

It is estimated that the mixture contained less than 3% each of the diisocyante ring having both cyanate groups reacted with either the telomer B alcohol or the allyl content was 41.5% by weight.

Solubility of the mixture so produced was determined by cloud point observations as described hereinabove. The results, shown, in Table 1, indicate a high degree of solubility in super critical $CO_2$.

TABLE 1

| Cloud Point in Supercritical $CO_2$ | |
|---|---|
| Temperature (° C.) | Cloud Point (psi) |
| 25 | 1170 |
| 26 | 1130 |
| 30 | 1413 |
| 33 | 1510 |
| 35 | 1642 |
| 39 | 1770 |
| 41 | 1879 |
| 44 | 2017 |
| 45 | 2015 |
| 49 | 2218 |
| 52 | 2290 |
| 53 | 2424 |
| 55 | 2476 |
| 59 | 2615 |
| 60 | 2665 |
| 63 | 2700 |
| 65 | 2812 |
| 69 | 2975 |
| 70 | 3028 |
| 74 | 3130 |
| 75 | 3263 |

2 g of the mixture so prepared was dissolved in 98 g of acetone at room temperature. The resulting solution was applied to three stone specimens each of the white Cararra marble (Example 1) and Lecce stone (Example 2), as hereinabove described. The specimens were allowed to stand for 1 week, after which they were subject to the procedures of dessication, water absorption determination, and water vapor permeability according the methods hereinabove described. Results are shown in Table 3.

Examples 3 and 4

IPDI/TBA/ROH (95:5); Designation TLF-9158

Isophorone diisocyanate (IPDI) was reacted with telomer B alcohol (TBA) as in Example 1 except that the mole ratio was ca. 2:1 TBA:IPDI so that about 95% of the isocyanates reacted with TBA. The reaction was driven to completion by reacting the remaining isocyanate with propyl alcohol. The resulting urethane was a mixture of ca. 90 mol-% of the diurethane represented by the structure:

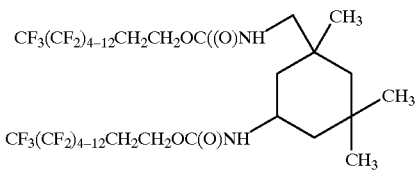

and approximately 10 mol-% of a mixture of the two chemical structures of Example 1 wherein the allyl moiety is replaced by a propyl moiety. The fluorine content of the urethane so produced was 50.9%.

Solubility of the mixture so produced was determined by cloud point observations as described hereinabove. The results, shown, in Table 2, indicate a high degree of solubility in super critical $CO_2$.

TABLE 2

Solubility in Supercritical $CO_2$

| Temperature (° C.) | Cloud Point (psi) |
|---|---|
| 28 | 1057 |
| 30 | 1260 |
| 35 | 1396 |
| 41 | 1680 |
| 43 | 1833 |
| 46 | 1894 |
| 51 | 2146 |
| 56 | 2307 |
| 58 | 2458 |
| 60 | 2460 |
| 64 | 2602 |
| 70 | 2892 |

The procedures of Example 1 were followed to prepare and test stone specimens. Example 3 was the marble, and Example 4, the Lecce stone. The results are shown in Table 3.

Comparative Example 1

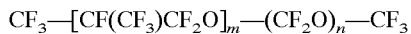

The test procedures of Example 1 were followed employing Fomblin® YR, a perfluorinated polyether available from Ausimont/Montefluos, Montedison/Montefluos Group, Milano, Italy. Fomblin® YR is the material currently preferred in commercial stone preservation applications. Stone test specimens were prepared and tested as hereinabove described. Only the biocalcarenite was tested. The amount of material applied was that followed in current commercial practice. Results are in Table 3.

TABLE 3

Results of Coating on Stone

| Example | Substrate | Coverage (g/sq.m.) | Protective Efficacy (Ep %)* | Reduction in Permeability (Rp %)** |
|---|---|---|---|---|
| 1 | Marble | 3.3 ± 0.3 | 67 ± 7 | 33 |
| 2 | Biocalcarenite | 12.1 ± 0.8 | 65 ± 1 | 19 |
| 3 | Marble | 3.1 ± 0.11 | 86 ± 1 | 28 |
| 4 | Biocalcarenite | 7.4 ± 0.7 | 75 ± 2 | 10 |
| Comp. Ex. 1 | Biocalcarenite | 49 | 18 | Not Determined |
| Control | Marble | None | 0 | 0 |
| Control | Biocalcarenite | None | 0 | 0 |

TABLE 3-continued

Results of Coating on Stone

| Example | Substrate | Coverage (g/sq.m.) | Protective Efficacy (Ep %)* | Reduction in Permeability (Rp %)** |
|---|---|---|---|---|

*Goal is 100%
**Goal is 0%

Comparative Example 2

Following the method described in F. Piacenti and M. Camaiti, *J. Fluorine Chem.*, 69 (1994), 227–235, the monofunctional acid fluoride precursor of a random perfluoropolyether of similar structure to the one in Comparative Example 1 was esterified and then condensed with hexamethylene diamine to form the diamide functionalized perfluoropolyether material with a MW of about 1800 Da. This material is considered the state of the art for providing a combination of high water repellency and low water permeability, as described in F. Piacenti, "The Conservation of Monumental Buildings: Recent Scientific Developments", a lecture presented at the $2^{nd}$ *International Congress on Science and Technology for the Safeguard of Cultural Heritage in the Mediterranean Basin*—Paris—Jul. 5 to 9, 1999.

Biocalcarenite specimens were coated with 48 g/m² of the perfluoropolyether diamide so prepared according to the methods of Comparative Example 1. $E_p$ was 55% as determined as hereinabove described.

What is claimed is:

1. A process comprising contacting stone with a non-polymeric urethane having the formula

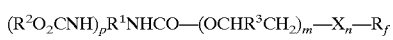

wherein p=1 or 2, $R^1$ is an aliphatic, cycloaliphatic or aromatic hydrocarbyl di- or tri-radical, $R^2$ is a fluorinated or non-fluorinated hydrocarbyl or hydroxyhydrocarbyl radical optionally substituted by one or more ether oxygens, $R^3$ is hydrogen or alkyl, X is a diradical selected from the group consisting of —OCH$_2$CH$_2$—, —OCH$_2$CH$_2$N(R⁴)SO$_2$—, —CH$_2$—, —O—, and —OCH$_2$—, wherein R⁴ is alkyl, $R_f$ is perfluoroalkyl, and m=0–30, n=0 or 1, with the proviso that if n=0, or if , n=1 and X is —O—, then m≠0 and wherein the process further comprises forming a solution of said non-polymeric urethane prior to contacting said stone therewith, wherein said stone is contacted with said solution of said non-polymeric urethane.

2. The process of claim 1 wherein p=1, $R^1$ is a diradical, $R^2$ is perfluoroalkyl or alkyl.

3. The process of claim 2 wherein $R^1$ is a cycloaliphatic diradical, $R^2$ is methyl, ethyl, or perfluoroalkyl, $R^3$ is hydrogen, n=0, and m=1 to 20.

4. The process of claim 3 wherein m=1, $R^2$ is a perfluoroalkyl radical having from 5–13 carbons, and $R^1$ is a cycloaliphatic diradical represented by the formula

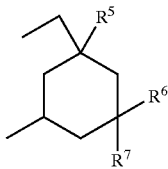

wherein $R^5$, $R^6$, and $R^7$ are all methyl.

5. The process of claim 4 wherein $R^5$, $R^6$, and $R^7$ are methyl.

6. The process of claim 1 wherein said solution comprises supercritical $CO_2$.

7. The process of claim 6 wherein said solution further comprises an organic solvent which is fugitive at a temperature at or above about 0° C.

8. The process of claim 7 wherein said organic solvent is selected from the group consisting of acetone, methyl-ethyl ketone, methyl isobutyl ketone, ethyl acetate, t-butyl acetate, hydrochlorofluorocarbons, and perfluorocarbons.

9. The process of claim 7 wherein the solvent is methyl isobutyl ketone.

10. A composition comprising stone and a non-polymer urethane having the formula

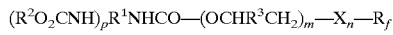

wherein p=1 or 2, $R^1$ is an aliphatic, cycloaliphatic or aromatic hydrocarbyl di- or tri-radical, $R^2$ is a fluorinated or non-fluorinated hydrocarbyl or hydroxyhydrocarbyl radical optionally substituted by one or more ether oxygens, $R^3$ is hydrogen or alkyl, X is a diradical selected from the group consisting of $-OCH_2CH_2-$, $-OCH_2CH_2N(R^4)SO_2-$, $-CH_2-$, and $-OCH_2-$, wherein $R^4$ is alkyl, $R_f$ is perfluoroalkyl, and m=0–30, n=0 or 1, with the proviso that if n=0, or if n=1 and X is $-O-$, then m≠0, and wherein said non-polymeric urethane is in the form of a coating on said stone and wherein said coating has a thickness in the range of 1.5 to 10 micrometers.

11. The composition of claim 10 wherein p=1, $R^1$ is a diradical, $R^2$ is perfluoroalkyl or alkyl.

12. The composition of claim 11 wherein $R^1$ is a cycloaliphatic diradical, $R^2$ is methyl, ethyl, or perfluoroalkyl, $R^3$ is hydrogen, n=0, and m=1 to 20.

13. The composition position of claim 12 wherein m=1, $R^2$ is a perfluoroalkyl radical having from 5–13 carbons, and $R_1$ is a cycloaliphatic diradical represented by the formula

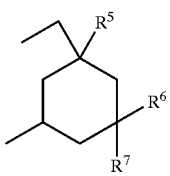

wherein $R^5$, $R^6$, and $R^7$ are all alkyl.

14. The composition of claim 13 wherein $R^5$, $R^6$, and $R^7$ are methyl.

* * * * *